United States Patent [19]

Massig

[11] Patent Number: 5,166,751
[45] Date of Patent: Nov. 24, 1992

[54] INTERFEROMETRIC PROFILOMETER SENSOR

[75] Inventor: Jürgen H. Massig, Essingen, Fed. Rep. of Germany

[73] Assignee: Carl-Zeiss-Stiftung, Heidenheim, Fed. Rep. of Germany

[21] Appl. No.: 632,916

[22] Filed: Dec. 24, 1990

[30] Foreign Application Priority Data

Dec. 23, 1989 [DE] Fed. Rep. of Germany ....... 3942896

[51] Int. Cl.$^5$ ................................. G01B 9/02
[52] U.S. Cl. ...................... 356/359; 356/351
[58] Field of Search .......... 356/351, 358, 359

[56] References Cited

U.S. PATENT DOCUMENTS

| | | | |
|---|---|---|---|
| 2,612,074 | 9/1952 | Mirau | 356/359 |
| 4,576,479 | 3/1986 | Downs | 356/351 |
| 4,639,139 | 1/1987 | Wyant et al. | 356/359 |
| 4,869,593 | 9/1989 | Biegen | 356/351 |

FOREIGN PATENT DOCUMENTS

| | | | |
|---|---|---|---|
| 0290648 | 11/1988 | European Pat. Off. | |
| 3322710 | 1/1985 | Fed. Rep. of Germany | |
| 0268524 | 5/1989 | Fed. Rep. of Germany | 356/359 |

OTHER PUBLICATIONS

"Scanning Force Microscopy Using a Simple Low-Noise Interferometer", den Boef, Applied Physics Letters, Jul. 1989.

"Force Microscope Using a Fiber-Optic Displacement Sensor", by D. Rugar et al., Rev. Sci. Instrum 59(11), Nov. 1988, pp. 2337 to 2340.

"Differential Phase Quadrature Surface Profiling Interferometer", by B. Omar et al., Applied Optics, vol. 29, No. 31, Nov. 1990.

"Laser Measurement System for Precise and Fast Positioning", by S. Mori et al., Optical Engineering, vol. 27, No. 9, Sep. 1988.

Paper by R. Erlandsson et al., entitled "Atomic Force Microscopy Using Optical Interferometry", published in the J. Vac. Sci. Technol. A6 (2), Mar./Apr. 1988, pp. 266 to 270.

Primary Examiner—Samuel A. Turner
Attorney, Agent, or Firm—Walter Ottesen

[57] ABSTRACT

The invention relates to an interferometer sensor for measuring distance changes of a small surface. The sensor defines a Mirau-like interferometer arrangement having a measurement surface and a reference surface. For making precise measurements of a small distance change, a retarder is arranged between these surfaces and effects a difference of the path differences between a measurement beam and a reference beam of approximately λ/4 for two polarization directions. The powers of the radiation components with these polarization directions are measured by a detecting device. The detecting device includes a polarization-dependent beam splitter and two detectors.

29 Claims, 3 Drawing Sheets

INTERFEROMETRIC PROFILOMETER SENSOR

FIELD OF THE INVENTION

The invention relates to an interferometric sensor which can preferably be used with an atomic force microscope. The sensor measures the changes in distance of a small reflective measurement surface.

BACKGROUND OF THE INVENTION

In atomic force microscopes, the specimen having a surface to be investigated is placed on an xyz-scanner and is pressed lightly against a fine tip which is attached to a cantilever. The deflection of this cantilever can be measured in different ways.

European patent publication 0,290,648 discloses that the cantilever and its carrier can be so configured that an electrical quantity such as the capacitance is changed by the deflection.

An interferometric method is described in the paper of R. Erlandsson et al entitled "Atomic force microscopy using optical interferometry" published in the J. Vac. Sci. Technol. A6 (2), March/April 1988, pages 266 to 270. For this purpose, the cantilever is configured so as to be reflecting at the proximity of the measurement tip and the measurement beam of a Fizeau-type interferometer is focussed on this measurement surface via a microscope objective. An optical plate is disposed on the other side of the microscope objective with one boundary surface of the optical plate functioning as a reference surface. The approximately parallel laser beam, which incidents perpendicularly on this reference surface, comes from a beam splitter. This beam splitter passes the light reflected from the measurement and reference surfaces to a detector and deflects the radiation coming from a laser in the direction of the microscope objective. For this purpose, the beam splitter is configured so as to be polarization dependent and a λ/4-plate is disposed between the beam splitter and the optical plate which prevents radiation from being reflected back into the laser. The radiation power which is measured by the detector is dependent upon the distance of the measurement surface from the rest of the interferometer because of the interference of the measurement beam and the reference beam. Changes in the detector signal are therefore obtained with changes in distance of the measuring surface.

It is a disadvantage of this known interferometric sensor that small distance changes of the measurement surface cannot be measured with adequate accuracy when maximum or minimum radiation energies impinge upon the detector. Furthermore, the large path-length difference of the light reflected from the measurement surface and the reference surface requires a high wavelength stability and a large coherence length and therefore an expensive laser. The large path-length difference furthermore causes a high temperature sensitivity of the arrangement.

SUMMARY OF THE INVENTION

It is an object of the invention to provide an interferometric sensor with which small distance changes can always be measured with adequate precision and which requires a cost-effective laser which is small with respect to its dimensions. It is a further object of the invention to provide such an interferometric sensor which is as insensitive as possible to temperature influences.

The object of the invention is realized with an interferometric sensor wherein: a beam splitter and a reference surface are arranged between the microscope objective and the measurement surface; a retarder is arranged between the reference surface and the measurement surface and is configured so that two radiation components having mutually perpendicular polarizations and a path difference (for a two-time traversal) of approximately λ/4 are produced so that the path differences between the measurement beam and the reference beam differ between these components by an amount of approximately λ/4; and, a polarization-dependent beam splitter and two detectors are provided as a detecting device.

The arrangement of a beam splitter and a reference surface between the microscope objective and the measurement surface is known from the so-called Mirau arrangement which is described, for example, in U.S. Pat. No. 2,612,074. This Mirau interferometric arrangement is however known only for generating a two-dimensional interferogram of a microscopic specimen. With this interferometric arrangement, the investigation of the surface contour of the specimen takes place with the aid of interference fringes. The topography of the surface can be determined from the course of these interference fringes. This arrangement is therefore related to the investigation of a surface.

It is however an object of the invention to detect the distance changes as a function of time for a point-shaped measurement location. If one would adopt the Mirau arrangement for this task in that the time-dependent change of the topography is detected via an image processing, a very great and partially superfluous effort would be expended since the topography does not change in this case. If only one point of the surface is taken in order to avoid an effort which is too great, then the above-described situation would again develop that small changes and their direction cannot always be determined with adequate accuracy which can be partially compensated in the known Mirau arrangement by means of the information from the vicinity of the point.

According to a feature of the invention, a retarder is introduced by means of which the radiation having a first polarization direction is delayed with respect to the radiation having a second polarization direction perpendicular thereto. Two detectors are also provided for making separate power measurements for both radiation components. The object of the invention is then achieved with relatively little complexity with this retarder and the two detectors.

The arrangement of the reference surface between the microscope objective and the measurement surface permits an arrangement with small distances between the measurement surface and the reference surface whereas for this arrangement it can easily be achieved that both path lengths are nearly equal. Therefore, a light source in the form of a laser having a low wavelength stability and a small coherence length can be used. Such a laser can, for example, be a laser diode.

In a first advantageous embodiment of the invention, the radiation emanating from the laser is focussed onto the measurement surface and the reference surface. The microscope objective and the beam splitter are illuminated rotation-symmetrically with respect to the optical axis.

In a second advantageous embodiment, the radiation emanating from the laser is focussed at a small distance ahead of the measurement surface and the reference surface so that the radiation reflected from the measurement surface and the reference surface is focussed on the optical axis where they are deflected by a small-surface mirror to the detecting device.

In a third advantageous embodiment, the measurement objective and the beam splitter are illuminated by the radiation passing to the measurement surface and the reference surface to the extent of only one half and from the radiation passing to the detecting device illuminated only to the other half so that the outgoing beam and the return beam are spatially separated from each other.

The retarder can be arranged between the beam splitter and the measurement surface or between the beam splitter and the reference surface. The retarder can be cemented into the plate which carries the partially reflecting layer of the beam splitter or it can be cemented into the plate which carries the reflective layer of the reference surface. On the other hand, the retarder can be cemented onto the free surfaces of the plates.

It is here noted that the $\lambda/4$-plate referred to in the above-mentioned publication of Erlandsson et al has a completely different purpose. In Erlandsson et al, the $\lambda/4$-plate simply coacts with the polarizing beam splitter to prevent the laser radiation from being reflected back into the laser. The application of the retarder in the invention corresponds to the known generation of a so-called quadrature signal which will be explained in greater detail with respect to the figures.

The path difference of the retarder (for two traversals) may not only be $\lambda/4$ but also $\lambda/4 + n \lambda/2$.

A special advantage of the invention, and in contrast to the arrangement of Erlandsson et al, is that very modest requirements are imposed upon the microscope objective since lens errors distort the wave fronts of the measurement and reference beams identically so that interference is not affected. Since the microscope objective of the invention does not generate an image, it can be made up of an individual lens which can even be made of plastic. This is in sharp contrast to the Mirau arrangement.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
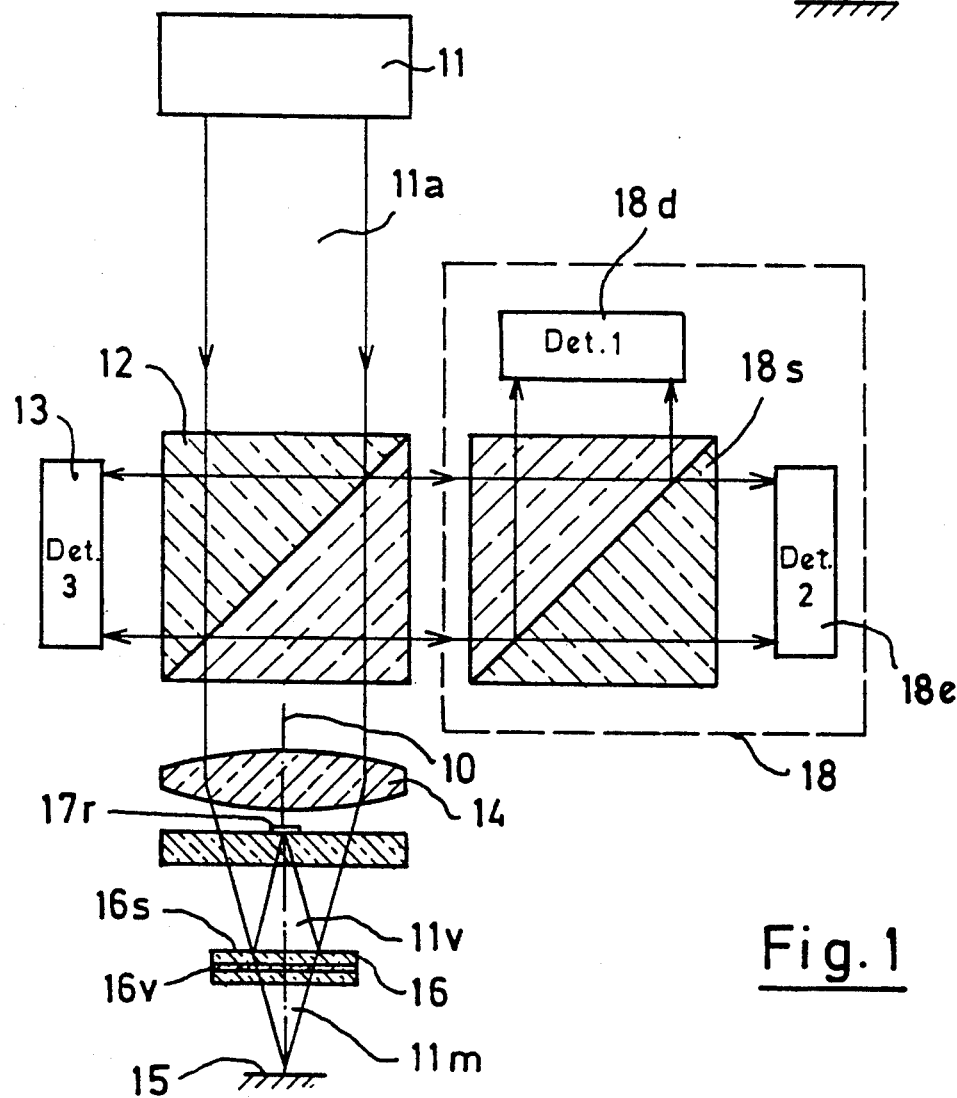
FIG. 1 shows an arrangement wherein the radiation emanating from the laser is focussed on the measuring surface and on the reference surface and the microscope objective and the beam splitter are illuminated rotation symmetrically to the optical axis.

In FIG. 1, reference numeral 11 identifies a laser, or, for example, a laser diode having a collimator. The beam 11a of approximately parallel rays is reflected in part onto the detector 13 by the splitter cube 12 which has the single task of controlling the power supplied by the laser 11. This control is unnecessary when there is adequate power stability or minimum requirements as to precision. The beam passes through the beam splitter and is focussed by the microscope objective 14 on the reflecting measurement surface 15. The converging beam is split into a measurement beam 11m and a reference beam 11v by the beam splitter 16s with the reference beam being reflected by the reference surface 17r. The reference surface 17r crops only a small portion of the rays directly entering or leaving the microscope objective. Measurement and reference beams are again combined after the reflection of the reference beam by the beam splitter 16s and travel as approximately parallel rays back to the splitter cube 12 whereat the rays are reflected in common in the direction of the detecting device 18.

The beam splitter 16s comprises a partially reflecting layer which is applied to the glass plate 16. In an advantageous embodiment, the retarder 16v is cemented into this glass plate and can be in the form, for example, of a birefringent polyvinyl alcohol foil. Because of its birefringence, the retarder effects a splitting into two radiation components with mutually perpendicular polarization. An optical path difference of approximately $\lambda/4$ arises between these components for two traversals. Different path differences between the measuring beam and the reference beam arise for the two polarization directions because of this splitting of the measuring beam 11m. The difference amounts to approximately $\lambda/4$. In the embodiments described with respect to the drawings, the retarder is preferably so built in that the polarization directions lie in and perpendicular to the plane of the drawing, respectively.

In the detecting device 18, the radiation having the one polarization direction is directed onto the detector 18d and the radiation having the other polarization direction is guided onto the detector 18e. The retarder can effect a difference in the path differences of the measurement beam 11m and the reference beam 11v of approximately $\lambda/4$. When this occurs, the detectors (18d, 18e) receive different signals from at least one of which a direction and an amount of a distance change of the measurement surface 15 can be reliably and precisely determined. For this purpose, the radiation of the light source 11 when impinging on the beam splitter 16s must not be linearly polarized in one of the two polarization directions. In the event that light source is linearly polarized, its polarization direction is orientated so that approximately the same radiation powers occur in the polarization directions of the retarder.

As a light source, the laser diode SLD 202 U manufactured by the Sony Company can be used. The radiation of this light source is approximately completely linearly polarized. Suitable detectors are, for example, the silicon photodiodes BPW 34 B manufactured by Siemens Aktiengesellschaft.

The splitting of radiation by means of a retarder, such as a λ/4-plate, into two components of which the second component is shifted in phase with respect to the first component by π/2 and the separation of the two components by means of polarization-dependent beam splitters is known with respect to interferometers from the text of M. Ross entitled "Laser Applications", Volume 1, page 84, Academic Press, New York (1971). This method is also known under the designation quadrature signal and is explained in greater detail in the following for an embodiment of the invention.

As a consequence of the interference of the measuring beam and the reference beam, a change in distance of the measuring surface 15 in the direction of the optical axis 10 produces an alternating-voltage signal in a detector such as detector 18d which signal is superposed on a direct-current signal and has a waveform defined by the equation:

$$U(d) = U_1 \sin(4\pi d/\lambda + \phi_o)$$

wherein: d=the distance, λ=the wavelength of the radiation used, $U_1$=the maximum amplitude of the alternating voltage signal and $\phi_o$=a constant phase angle. With a signal of this kind, distance changes cannot be determined with precision in the vicinity of the maximum and minimum nor can the changes be determined reliably with respect to direction. These deficiencies are avoided with the second detector if the alternating-voltage signal of this second detector is shifted in phase by approximately π/2 because the signal of the second detector always has distinct changes in magnitude and waveform where the first signal passes through an extreme value. Two signals phase shifted in this manner are generated by the retarder 16v in that a path-length difference of λ/4 or a phase difference of π/2 occurs for the two polarization directions of the measurement beam for two traversals.

In the arrangement described, part of the radiation is reflected back into the light source. This must be prevented in some lasers and can be achieved by utilizing a Faraday insulator between laser 11 and splitter cube 12. The arrangements shown in FIGS. 2 and 3 are substantially less costly wherein no radiation is reflected back into the light source because of the geometric separation of the outgoing and return paths.

Figure 2:
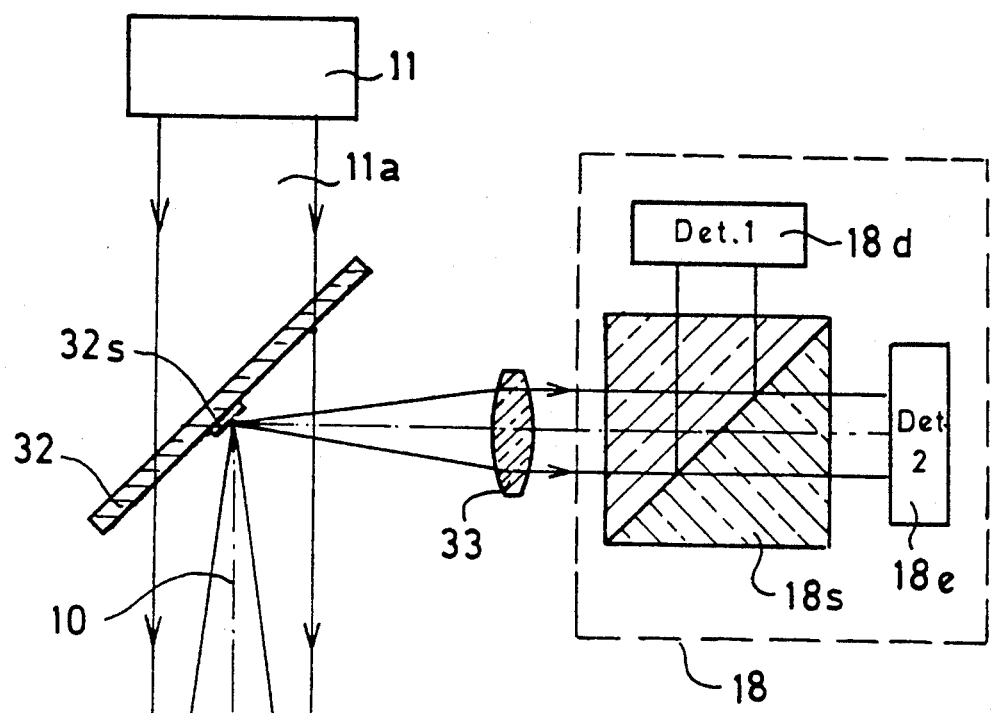
FIG. 2 shows an arrangement wherein the radiation emanating from the laser is focussed at a small spacing ahead of the measurement surface and the reference surface.
Figure 2:
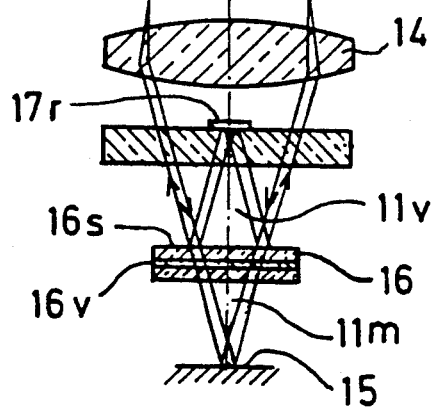

In FIG. 2, the condition is obtained that the measuring surface 15 no longer lies in the focus of the objective by providing a somewhat greater distance of the microscope objective 14 from the measurement surface 15 whereby the reflected beams are convergent and therefore can, at their focus, be deflected out of their illuminating beam path by a small mirror 32s on a glass plate. The deflected divergent beam is collimated by lens 33 which is necessary if the spacing of the detecting device 18 is large. The remaining configuration corresponds to that shown in FIG. 1.

Figure 3:
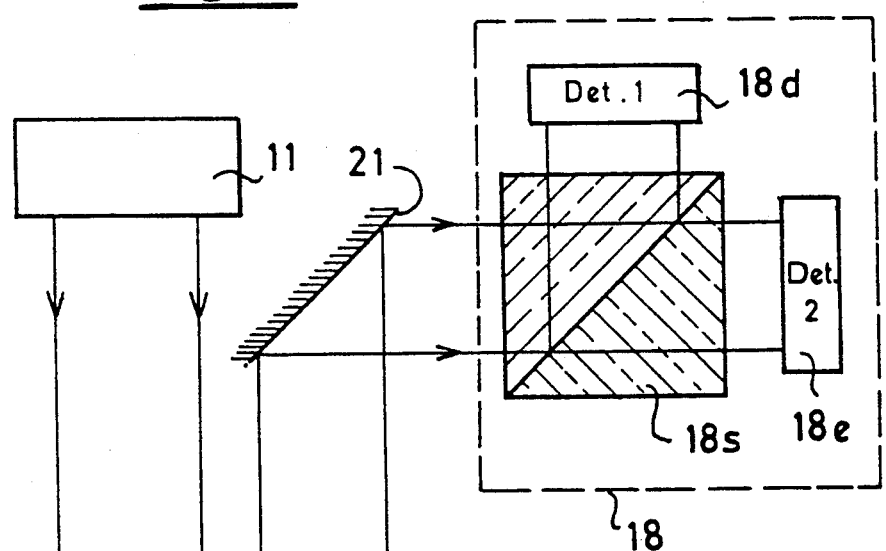
FIG. 3 shows an arrangement wherein the radiation traveling to the measurement surface and to the reference surface illuminates the microscope objective and the beam splitter in only one half thereof and the radiation traveling to the detecting device illuminates the microscope objective and the beam splitter only in the other half thereof.

In FIG. 3, of the beams traveling to the measuring surface 15 and the reference surface 17r, at most half of the microscope objective 14 and the beam splitter 16s is illuminated and the beams reflected from the measurement surface 15 and the reference surface 17r pass through the other half of the microscope objective 14 and the beam splitter 16s. The remaining configuration corresponds to that shown in FIG. 1 except for the deflecting mirror 21.

As shown in FIGS. 1 to 3, the retarder can be mounted between the beam splitter 16s and the measurement surface 15. In this case, it is advantageous to integrate the retarder into the glass plate 16 in that a λ/8-plate is cemented to the rear side of the glass plate 16 or a λ/8-foil is cemented between the two halves of the glass plate 16. The retarder can also be an independent component mounted between the beam splitter 16s and the measurement surface 15.

The retarder can, in the form of a λ/8-plate or a λ/8-foil, be mounted between the beam splitter and the reference surface. In this case, the retarder acts on both beams in the same manner, in advance of the splitting of the measurement and reference beams as well as after these beams are brought together, and therefore no difference is produced in the path differences in these segments of the beam paths.

Figure 4:
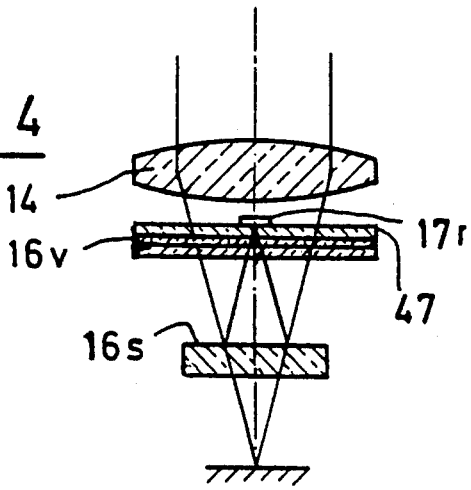
FIG. 4 shows an embodiment wherein the retarder is cemented into the plate on which the reference surface is applied as a reflective layer; and, FIG. 5 shows an embodiment wherein the retarder is realized by the partially reflecting layer of the beam splitter and the reflecting layer of the reference surface.

An advantageous embodiment is shown in FIG. 4 wherein a λ/8-foil 16v is cemented between the two halves of a glass plate 47. The reference surface 17r is applied to the side of the glass plate 47 facing away from the beam splitter 16s and is in the form of a reflective layer. In this case also, the retarder can be configured as an independent component mounted between the beam splitter 16s and the reference surface 17r.

Figure 5:
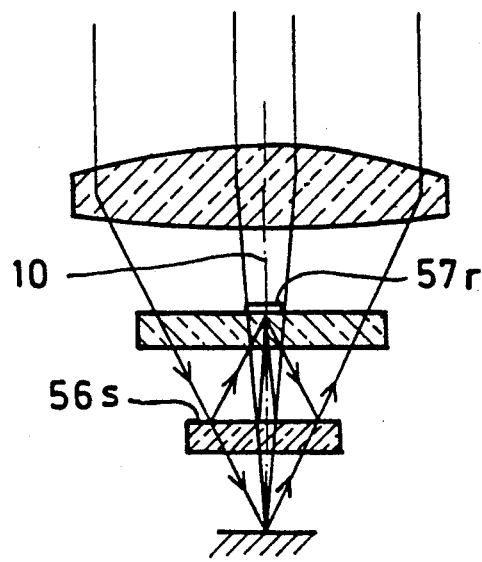

The retarder can also be realized in the form of a layer 56s which is partially reflective and therefore is used as a beam splitter. The reference surface can also be realized as a reflective layer 57r which acts at the same time as a retarder. In FIG. 5, this is illustrated for the case wherein the retarder is realized as both types of layers. This embodiment of the retarder is however only possible for an illumination (which is not rotationally symmetrical) of the microscope objective 14 and the elements following up to the measurement surface 15 as shown in FIG. 3. In this way, the radiation impinges on the above-mentioned layers at an intermediate angle which deviates from the optical center axis 10 so that a division into the s-polarization and p-polarization is provided as known from the Fresnel formulas for radiation which impinges at an inclination.

It is understood that the foregoing description is that of the preferred embodiments of the invention and that various changes and modifications may be made thereto without departing from the spirit and scope of the invention as defined in the appended claims.

What is claimed is:

1. An interferometric sensor for measuring distance changes of a small reflective measurement surface, the interferometric sensor comprising:

a light source for supplying a light beam;

a microscope objective for defining an optical axis and focussing said beam;

a beam splitter mounted between said objective and said measuring surface for splitting said light beam into a measurement beam and a reference beam;

reference surface means disposed between said objective and said beam splitter for receiving and reflecting said reference beam;

a retarder mounted between said reference surface means and said measuring surface for splitting said measurement beam into two components having respective polarizations perpendicular to each other with said components differing from each other by an optical path difference corresponding to approximately λ/4 because of a two-time traversal through said retarder, the number of traversals through said retarder of said reference beam and of said measurement beam differing by two, thereby producing a difference of said optical path difference between said measuring beam and said reference beam of approximately λ/4; and a detecting device including a polarization-dependent beam splitter and two detectors.

2. The interferometric sensor of claim 1, for use in a microscope such as an atomic force microscope, said light source being a laser with said beam defining a beam axis, said microscope objective being adapted to focus said measurement beam on said measurement surface and said reference beam on said reference surface; and, said objective being positioned so as to cause said optical axis to be coincident with said beam axis to permit said objective and said beam splitter to be rotation-symmetrically illuminated relative to said optical axis.

3. The interferometric sensor of claim 2, said retarder being mounted between said beam splitter and said measurement surface.

4. The interferometric sensor of claim 3, said beam splitter including a glass plate defining a surface and a partially reflecting layer formed on said surface; and, said retarder being cemented into said glass plate.

5. The interferometric sensor of claim 3, said beam splitter including a glass plate defining first and second surfaces and a partially reflecting layer formed on said first surface; and, said retarder being cemented onto said second surface.

6. The interferometric sensor of claim 2, said retarder being mounted between said beam splitter and said reference surface means.

7. The interferometric sensor of claim 6, said reference surface means including a glass plate having a surface and a reflective layer formed on said surface for defining a reference surface; and, said retarder being cemented into said plate.

8. The interferometric sensor of claim 7, said retarder being a polyvinyl alcohol foil.

9. The interferometric sensor of claim 6, said reference surface means including a glass plate defining first and second surfaces and a reflective layer formed on said first surface for defining a reference surface; and, said retarder being cemented onto said second surface.

10. The interferometric sensor of claim 9, said retarder being a quartz plate.

11. The interferometric sensor of claim 1 for use in a microscope such as an atomic force microscope, said light source being a laser and said light beam defining a beam axis; said objective being adapted to focus said measurement beam at a small spacing ahead of said measurement surface and said reference beam at a small spacing ahead of said reference surface means thereby causing the measurement beam reflected at said measurement surface and said reference beam reflected at said reference surface means to be focussed at a position on said optical axis; and, a small mirror mounted at said position on said optical axis for deflecting the reflected measurement and reference beams to said detecting device.

12. The interferometric sensor of claim 11, said retarder being mounted between said beam splitter and said measurement surface.

13. The interferometric sensor of claim 12, said beam splitter including a glass plate defining a surface and a partially reflecting layer formed on said surface; and, said retarder being cemented into said glass plate.

14. The interferometric sensor of claim 12, said beam splitter including a glass plate defining first and second surfaces and a partially reflecting layer formed on said first surface; and, said retarder being cemented onto said second surface.

15. The interferometric sensor of claim 11, said retarder being mounted between said beam splitter and said reference surface means.

16. The interferometric sensor of claim 15, said reference surface means including a glass plate having a surface and a reflective layer formed on said surface for defining a reference surface; and, said retarder being cemented into said plate.

17. The interferometric sensor of claim 16, said retarder being a polyvinyl alcohol foil.

18. The interferometric sensor of claim 15, said reference surface means including a glass plate defining first and second surfaces and a reflective layer formed on said first surface for defining a reference surface; and, said retarder being cemented onto said second surface.

19. The interferometric sensor of claim 18, said retarder being a polyvinyl alcohol foil.

20. The interferometric sensor of claim 1 for use in a microscope such as an atomic force microscope, said light source being a laser and said light beam defining a beam axis; said objective and said beam splitter each having first and second halves; said objective and said beam splitter being positioned with respect to said beam axis so as to cause the radiation coming from said laser to illuminate only said first half of said objective and said first half of said beam splitter and so as to cause the radiation passing to said detecting device from said measurement surface and said reference surface means to illuminate only said second half of said beam splitter and said second half of said objective.

21. The interferometric sensor of claim 20, said beam splitter having a partially reflective layer formed thereon and said reference surface means having reflective layer formed thereon; and, said retarder being defined by said reflective layers and said reflective layers being adapted so as to cause the reflections thereof to produce differences between the phase jumps of radiation components with said polarization directions corresponding to approximately λ/2.

22. The interferometric sensor of claim 20, said retarder being mounted between said beam splitter and said measurement surface.

23. The interferometric sensor of claim 22, said beam splitter including a glass plate defining a surface and a partially reflecting layer formed on said surface; and, said retarder being cemented into said glass plate.

24. The interferometric sensor of claim 22, said beam splitter including a glass plate defining first and second surfaces and a partially reflecting layer formed on said first surface; and, said retarder being cemented onto said second surface.

25. The interferometric sensor of claim 20, said retarder being mounted between said beam splitter and said reference surface means.

26. The interferometric sensor of claim 25, said reference surface means including a glass plate having a surface and a reflective layer formed on said surface for defining a reference surface; and, said retarder being cemented into said plate.

27. The interferometric sensor of claim 26, said retarder being a polyvinyl alcohol foil.

28. The interferometric sensor of claim 25, said reference surface means including a glass plate defining first and second surfaces and a reflective layer formed on said first surface for defining a reference surface; and, said retarder being cemented onto said second surface.

29. The interferometric sensor of claim 28, said retarder being a quartz plate.

* * * * *

UNITED STATES PATENT AND TRADEMARK OFFICE
CERTIFICATE OF CORRECTION

PATENT NO. : 5,166,751

DATED : November 24, 1992

INVENTOR(S) : Jürgen H. Massig

It is certified that error appears in the above-identified patent and that said Letters Patent is hereby corrected as shown below:

In the title page, in the Abstract, line 1: delete "interferometer" and substitute -- interferometric -- therefor.

In column 8, line 33: insert -- a -- between "having" and "reflective".

In column 8, line 39: delete "$\lambda/2$" and insert -- $\pi/2$ -- therefor.

Signed and Sealed this

Twelfth Day of October, 1993

*Attest:*

BRUCE LEHMAN

*Attesting Officer*    *Commissioner of Patents and Trademarks*